US009146401B2

(12) United States Patent
Endo

(10) Patent No.: US 9,146,401 B2
(45) Date of Patent: Sep. 29, 2015

(54) PROJECTOR AND IMAGE DISPLAY SYSTEM

(71) Applicant: SEIKO EPSON CORPORATION, Tokyo (JP)

(72) Inventor: Takashi Endo, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 183 days.

(21) Appl. No.: 13/752,761

(22) Filed: Jan. 29, 2013

(65) Prior Publication Data
US 2013/0201455 A1 Aug. 8, 2013

(30) Foreign Application Priority Data

Feb. 3, 2012 (JP) .................................. 2012-021672
Nov. 28, 2012 (JP) .................................. 2012-260248

(51) Int. Cl.
G03B 21/14 (2006.01)
G03B 21/00 (2006.01)
H04N 9/12 (2006.01)
G02B 27/22 (2006.01)
G02B 26/00 (2006.01)
G02B 27/26 (2006.01)

(52) U.S. Cl.
CPC .............. *G02B 27/22* (2013.01); *G02B 26/008* (2013.01); *G02B 27/26* (2013.01)

(58) Field of Classification Search
CPC ......................... H04N 13/0459; H04N 9/3197
USPC ................... 353/84, 31, 7; 348/743; 359/890; 362/293
See application file for complete search history.

(56) References Cited

U.S. PATENT DOCUMENTS

2005/0030400 A1* 2/2005 Shigeta .......................... 348/294
2005/0041160 A1 2/2005 Monch
2006/0119795 A1 6/2006 Lippey et al.
2008/0239068 A1* 10/2008 Lipton ............................ 348/60

FOREIGN PATENT DOCUMENTS

| JP | A-2005-513581 | 5/2005 |
| JP | A-2008-522247 | 6/2008 |
| JP | A-2008-181032 | 8/2008 |
| JP | A-2011-48071 | 3/2011 |
| WO | WO 03/056841 A1 | 7/2003 |
| WO | WO 2006/060655 A2 | 6/2006 |

* cited by examiner

*Primary Examiner* — William C Dowling
*Assistant Examiner* — Ryan Howard
(74) *Attorney, Agent, or Firm* — Oliff PLC

(57) ABSTRACT

A projector makes the light modulation device form the first image while keeping the second wheel adapted to separate the light into a plurality of colored lights corresponding to the second and third images in a state in which the second transmission region adapted to transmit the light including the plurality of colored lights is located on the light path, and rotating the first wheel adapted to separate the light into a plurality of colored lights corresponding to the first image when projecting the first image, and the light modulation device form the second and third images while keeping the first wheel in a state in which the first transmission region adapted to transmit the light including the plurality of colored lights is located on the light path, and rotating the second wheel when projecting the second image and the third image.

6 Claims, 9 Drawing Sheets

PROJECTOR AND IMAGE DISPLAY SYSTEM

BACKGROUND

1. Technical Field

The present invention relates to a projector and an image display system.

2. Related Art

In the past, there has been known a projector having a light source, a light modulation device for modulating the light emitted from the light source, and a projection optical device for projecting the light thus modulated on a target projection surface such as a screen. As the light modulation device used for such a projector, a transmissive or reflective liquid crystal panel or a digital micromirror device (DMD; a registered trademark of Texas Instruments in the United States) is adopted in some cases.

Incidentally, in recent years, there has been proposed an image display device forming a right-eye image and a left-eye image as parallax images, and individually inputting these images respectively to the right eye and the left eye of the observer to thereby display an image (hereinafter abbreviated as a "three-dimensional image" in some cases), which can be viewed stereoscopically due to the parallax (e.g., JP-A-2011-48071 (Document 1)).

In the projector described in Document 1, the DMD described above is adopted as the light modulation device, and a polarization plate wheel and a color wheel are disposed on the light path of the light from the light source to the DMD.

The polarization plate wheel is provided with a first polarization area, a second polarization area, and a non-polarization area. Among these areas, the first polarization area transmits a first polarization component perpendicular to the radial direction of the wheel, and blocks another polarization component (e.g., a second polarization component). Further, the second polarization area transmits the second polarization component parallel to the radial direction of the wheel, and blocks another polarization component (e.g., the first polarization component). It should be noted that the non-polarization area transmits all polarization components of the incident light.

The color wheel is provided with an R area transmitting a red component among the incident light, a G area transmitting a green component, a B area transmitting a blue component, and a W area transmitting all of the color components.

Further, in the case of displaying a two-dimensional image in the projector, the polarization plate wheel is stopped in the state in which the non-polarization area is located on the light path, the color wheel is rotated, and thus the DMD forms a color image corresponding to the colored light transmitted through the non-polarization area and the color wheel to thereby form and then project the two-dimensional image.

On the other hand, in the case of displaying a three-dimensional image, the polarization plate wheel and the color wheel are rotated in sync with each other, and thus a color image corresponding to the colored light transmitted through the polarization plate wheel and the color wheel is formed by the DMD. Thus, the red image, the green image, and the blue image constituted by the first polarization component and the red image, the green image, and the blue image constituted by the second polarization component are formed and then projected. Then, by observing the images via a pair of glasses having a filter similar to the first polarization area described above disposed at the position corresponding to either one of the right eye and the left eye, and a filter similar to the second polarization area described above disposed at the position corresponding to the other eye, the observer observes the three-dimensional image.

However, in the projector described in Document 1 mentioned above, it is required to rotate the polarization plate wheel and the color wheel in sync with each other in the case of displaying the three-dimensional image. Therefore, if the rotational phases of the wheels are shifted from each other, or the rotational speed of each of the wheel is varied, for example, there arises a problem that the three-dimensional image fails to be appropriately displayed.

SUMMARY

An advantage of the invention is to provide a projector and an image display system capable of appropriately displaying an image.

A projector according to an aspect of the invention is a projector, which can be switched between a mode of projecting a first image and a mode of projecting a second image and a third image, including a light source device, a light modulation device adapted to modulate light emitted from the light source device, a projection optical device adapted to project the light modulated, a first wheel rotatably disposed on a light path of the light entering the light modulation device from the light source device, and having a first color separation region adapted to transmit the light from the light source device while separating the light into a plurality of colored lights corresponding to the first image, and a first transmission region adapted to transmit the light including the plurality of colored lights, a second wheel rotatably disposed on the light path of the light entering the light modulation device from the light source device, and having a second color separation region adapted to transmit the light from the light source device while separating the light into a plurality of colored lights corresponding to the second image, a third color separation region adapted to transmit the light from the light source device while separating the light into a plurality of colored lights corresponding to the third image, and a second transmission region adapted to transmit the light including the plurality of colored lights, and a control device adapted to control operations of the light modulation device, the first wheel, and the second wheel, wherein the colored lights separated into in the first color separation region, the second color separation region, and the third color separation region have respective light characteristics different from each other, and the control device further makes the light modulation device form the first image while keeping the second wheel in a state in which the second transmission region is located on the light path, and rotating the first wheel when projecting the first image, and the light modulation device form the second image and the third image while keeping the first wheel in a state in which the first transmission region is located on the light path, and rotating the second wheel when projecting the second image and the third image.

It should be noted that the plurality of colored lights corresponding to the first image denotes the plurality of colored lights for forming the first image, and in other words, represents the plurality of colored lights for the first image. The same applies to the plurality of colored lights corresponding to the second image and the plurality of colored lights corresponding to the third image.

Further, as an example of the fact that the characteristics of the plurality of colored lights corresponding to the first image transmitted through the first color separation region, the characteristics of the plurality of colored lights corresponding to the second image transmitted through the second color separation region, and the characteristics of the plurality of colored lights corresponding to the third image transmitted through the third color separation region are different from each other, a difference in polarization direction, and a difference in wavelength band can be cited.

According to the aspect of the invention, in the case of projecting the first image, the rotation of the second wheel is stopped in the state in which the second transmission region is located on the light path of the light emitted from the light source device, and the first wheel alone is rotated. On this occasion, the light emitted from the light source device enters the first color separation region of the first wheel, and the plurality of colored lights corresponding to the first image is individually transmitted through the first color separation region. These colored lights are transmitted through the second transmission region of the second wheel, and then enter the light modulation device, and form the first image.

On the other hand, in the case of projecting the second and third images, the rotation of the first wheel is stopped in a state in which the first transmission region is located on the light path, and the second wheel alone is rotated. On this occasion, the plurality of colored lights corresponding to the second image and the plurality of colored lights corresponding to the third image included in the light emitted from the light source device are transmitted through the first transmission region, and then enter the second wheel. The plurality of colored lights corresponding to the second image transmitted through the second color separation area of the second wheel individually enters the light modulation device, and forms the second image. Further, the plurality of colored lights corresponding to the third image transmitted through the third color separation area of the second wheel also individually enters the light modulation device, and forms the third image.

The light (the plurality of colored lights corresponding to the second image) transmitted through the second color separation region and the light (the plurality of colored lights corresponding to the third image) transmitted through the third color separation region are different in characteristics from each other. Therefore, the second image and the third image can be separated from each other based on the characteristics.

According to such a configuration, in the case of projecting the first image and in the case of projecting the second and third images, either one of the first wheel and the second wheel is rotated and the other thereof is stopped. Therefore, there is no chance of causing the difference in rotation between the wheels, which is caused in the projector described in Document 1. Therefore, it is possible not only to appropriately display the first image but also to appropriately display the second and third images since the characteristics of the colored lights constituting the second image and the characteristics of the colored lights constituting the third image are prevented from changing to an inseparable state.

Further, according to the configuration described above, it is not required to rotate the first wheel and the second wheel in sync with each other. Thus, the rotation control of the first wheel and the second wheel by the control device can be simplified compared to the projector described in Document 1.

Here, in the projector described in Document 1, if some failure occurs in the R region, the G region, and the B region provided to the color wheel, it is not achievable to form an image.

In contrast, in the aspect of the invention, even if a failure is caused in either one of the first wheel and the second wheel, the image can be formed using the other thereof. Therefore, the function of the projector can be assured.

In the aspect of the invention, it is preferable that the first color separation region of the first wheel is provided with a first colored light transmission region, a second colored light transmission region, and a third colored light transmission region, which respectively transmit a first colored light, a second colored light, and a third colored light, and each block colored lights other than the corresponding colored light, the second color separation region of the second wheel is provided with a fourth colored light transmission region, a fifth colored light transmission region, and a sixth colored light transmission region, which respectively transmit a fourth colored light, a fifth colored light, and a sixth colored light, and each block colored lights other than the corresponding colored light, the third color separation region of the second wheel is provided with a seventh colored light transmission region, an eighth colored light transmission region, and a ninth colored light transmission region, which respectively transmit a seventh colored light, an eighth colored light, and a ninth colored light, and each block colored lights other than the corresponding colored light, and the first colored light, the second colored light, the third colored light, the fourth colored light, the fifth colored light, the sixth colored light, the seventh colored light, the eighth colored light, and the ninth colored light have respective wavelength bands different from each other.

According to this configuration, the second image and the third image can surely be separated due to the difference in wavelength band between the colored lights respectively forming the second image and the third image. For example, by using a bandpass filter for transmitting the fourth colored light, the fifth colored light, and the sixth colored light (the fourth colored light, the fifth colored light, and the sixth colored light corresponding to the second image) transmitted through the second color separation region, and blocking the other colored lights, and the bandpass filter for transmitting the seventh colored light, the eighth colored light, and the ninth colored light (the seventh colored light, the eighth colored light, and the ninth colored light corresponding to the third image) transmitted through the third color separation region, and blocking the other colored lights, the second image and the third image can surely be separated. Therefore, it is possible to visually recognize the second image and the third image individually in a reliable manner.

In the aspect of the invention, it is preferable that the second color separation region and the third color separation region are provided with respective polarization elements transmitting lights having respective polarization directions different from each other.

It should be noted that as an example of the light transmitted through the polarization elements, linearly polarized lights (an S-polarized light and a P-polarized light) can be cited, and in addition, circularly polarized lights (right circularly polarized light and left circularly polarized light) can be cited.

According to this configuration, the second image and the third image can surely be separated due to the difference in polarization direction between the lights respectively forming the second image and the third image. Therefore, it is possible to visually recognize the second image and the third image individually in a reliable manner.

In the aspect of the invention, it is preferable that the light modulation device forms a black image at a timing at which the second transmission region is located on the light path when projecting the second image and the third image.

Here, in the case in which the second image and the third image are separated due to the difference in characteristics of the light described above to thereby make either one of the second image and the third image be observed by the right eye and the other thereof be observed by the left eye, unwanted light is visually recognized by the both eyes at the same time at the timing at which the second transmission region of the second wheel thus rotated is located on the light path described above. Such light causes the noise deteriorating the second image and the third image.

In contrast, by forming the black image at the timing at which the second transmission region is located on the light path, it is possible to inhibit the unwanted light from being visually recognized by the both eyes at the same time. Therefore, it is possible to suppress the deterioration of the second image and the third image.

An image display system according to another aspect of the invention includes the projector according to the aspect of the invention described above, and a pair of glasses provided with at least one of a first separation section adapted to transmit the colored lights transmitted through the second color separation region and block the colored lights transmitted through the third color separation region and a second separation section adapted to transmit the colored lights transmitted through the third color separation region and block the colored lights transmitted through the second color separation region.

According to this aspect of the invention, substantially the same advantages as in the projector described above can be obtained.

Further, since the pair of glasses are provided with at least one of the first separation section and the second separation section, by wearing the pair of glasses, the observer can surely observe at least one of the second image and the third image. It should be noted that if the pair of glasses are provided with the first separation section and the second separation section respectively disposed at the positions corresponding to the right eye and the left eye of the observer, and the projector has a configuration of projecting the right-eye image and the left-eye image, which are parallax images, as the second image and the third image, it becomes also possible to make the right-eye image enter the right eye of the observer and make the left-eye image enter the left eye using the pair of glasses. In this case, the image, which can be viewed stereoscopically, can visually recognized due to the parallax.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will hereinafter be explained with reference to the accompanying drawings.

Figure 1:
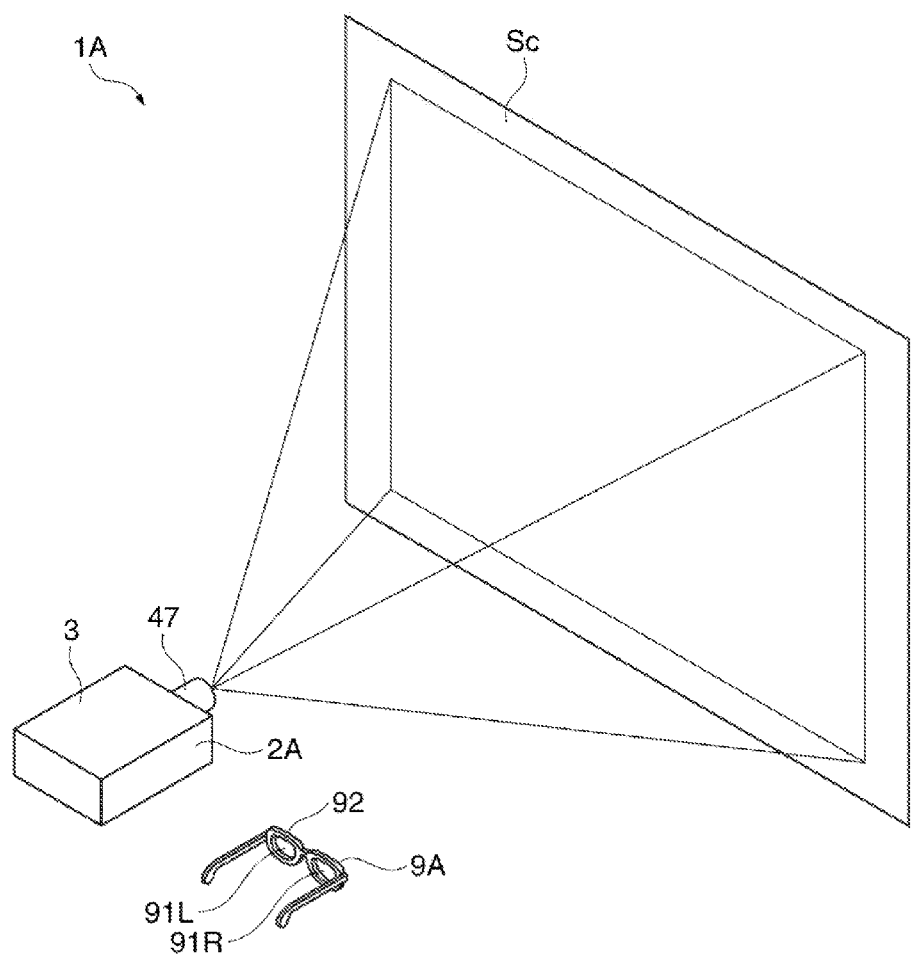
FIG. 1 is a schematic diagram showing a configuration of an image display system according to a first embodiment of the invention.

FIG. 1 is a schematic diagram showing a configuration of an image display system 1A according to the present embodiment.

As shown in FIG. 1, the image display system 1A according to the present embodiment is provided with a projector 2A capable of projecting a first image, a second image, and a third image, a screen Sc on which the images are projected and displayed, and a pair of glasses 9A for three-dimensional image observation.

It should be noted that in the present embodiment, the first image projected by the projector 2A corresponds to a two-dimensional image, and the second and third images correspond to the right-eye image and the left-eye image constituting a three-dimensional image (an image, which is constituted by the right-eye image and the left-eye image as the parallax images, and can be viewed stereoscopically). It should be noted that the two-dimensional image and the three-dimensional image each include a still image and a moving image.

Configuration of Glasses

A pair of glasses 9A are used by the observer when displaying the three-dimensional image. The pair of glasses 9A have a right-eye separation section 91R disposed at a position corresponding to the right eye of the observer, a left-eye separation section 91L disposed at a position corresponding to the left eye, and a frame 92 for supporting these separation sections.

The right-eye separation section 91R and the left-eye separation section 91L correspond respectively to a first separation section and a second separation section of the invention. Among these sections, the right-eye separation section 91R has a function of transmitting the right-eye image, and blocking the left-eye image. Further, the left-eye separation section 91L has a function of transmitting the left-eye image, and blocking the right-eye image.

By using such pair of glasses 9A, when the projector 2A projects the three-dimensional image, it is possible to make the right-eye image enter the right eye of the observer, and make the left-eye image enter the left eye of the observer. Further, by individually observing the right-eye image and the left-eye image respectively with the right eye and the left eye, a stereoscopic image (three-dimensional image) due to the parallax is visually recognized.

It should be noted that a configuration of the right-eye separation section 91R and the left-eye separation section 91L will be explained later in detail.

Configuration of Projector

Figure 2:
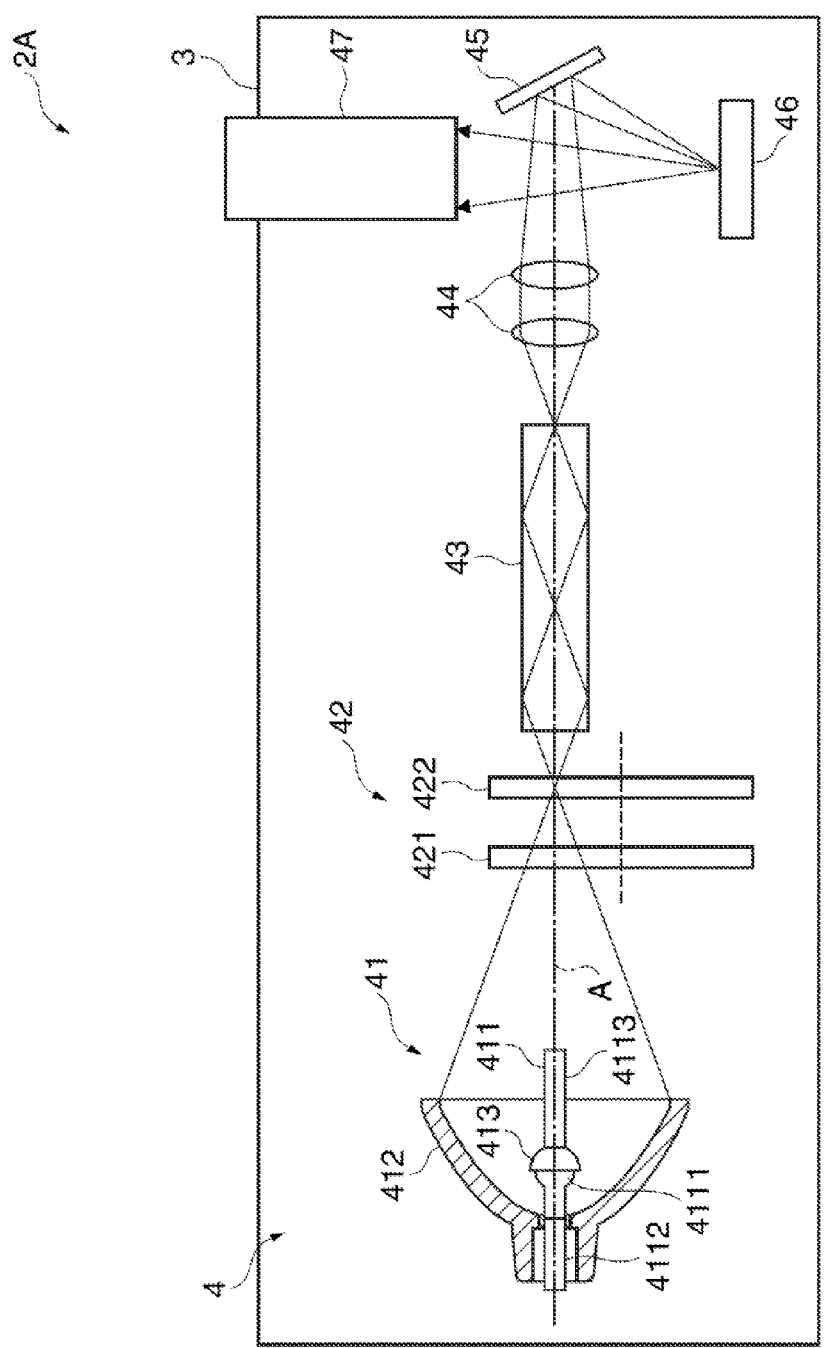
FIG. 2 is a schematic diagram showing a configuration of an optical unit in the first embodiment.

FIG. 2 is a schematic diagram showing a configuration of the projector.

The projector 2A is a device for forming and then projecting the image corresponding to the image information input thereto. The projector 2A is configured to be able to perform a two-dimensional image display mode for displaying the first image (the two-dimensional image) and a three-dimensional image display mode for displaying the second and third images (the three-dimensional image) while switching therebetween. It should be noted that in the case of displaying the three-dimensional image, the projector 2A according to the present embodiment forms and then displays the three-dimensional image corresponding to a so-called wavelength division system.

As shown in FIG. 2, such a projector 2A is provided with an optical unit 4 for forming and then projecting an image, a rotation device 5 (see FIG. 5) for rotating a first wheel 421 and a second wheel 422, described later, of the optical unit 4 independently of each other, a control device 6 (see FIG. 5), and an exterior housing 3 for housing these constituents inside.

It should be noted that although not shown in the drawings, the projector 2A is also provided with a power supply device for supplying the constituents of the projector 2A with electricity, and a cooling device for cooling an object of cooling, besides the constituents described above.

Configuration of Optical Unit

The optical unit 4 projects an image corresponding to an image signal input from the control device 6. The optical unit 4 is provided with a light source device 41, a color separation device 42, a uniformizing device 43, collecting lenses 44, a reflecting mirror 45, a light modulation device 46, and a projection optical device 47.

Figure 5:
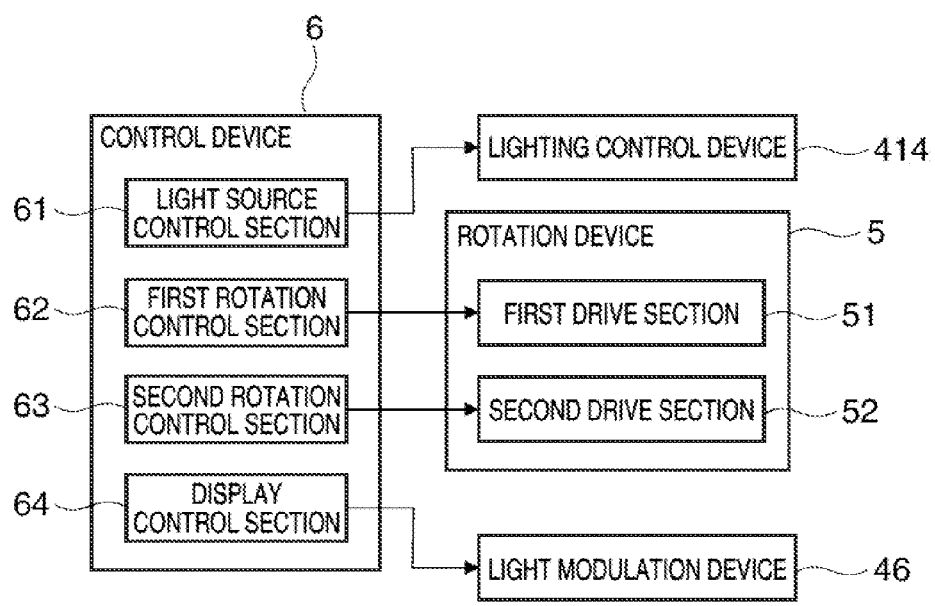
FIG. 5 is a block diagram showing a configuration of a rotation device and a control device in the first embodiment.

The light source device 41 is provided with a light source lamp 411 of a discharge emission type such as a super-high pressure mercury lamp, a first reflecting mirror 412 attached to one end of the light source lamp 411, a second reflecting mirror 413 attached to the other end of the light source lamp 411, and a lighting control device 414 (see FIG. 5).

The light source lamp 411 has a light emitting section 4111 having a roughly spherical shape, and sealing sections 4112, 4113 extending from both ends of the light emitting section 4111 toward respective directions opposite to each other. Inside the light emitting section 4111, there is formed a discharge space having a pair of electrodes and a light emitting substance encapsulated therein.

The second reflecting mirror 413 covers an outer surface of the light emitting section 4111 on the sealing section 4113 side, and reflects the light, which is input from the light emitting section 4111, toward the first reflecting mirror 412.

The first reflecting mirror 412 is attached to the sealing section 4112, reflects the light input from the light emitting section 4111 and the second reflecting mirror 413, and converges the light at a focal position on an illumination light axis A. The illumination light axis A represents the center axis of the light emitted from the light source device 41, and "positioning on the light path of the light" and "positioning on the illumination light axis A" are used synonymously with each other.

It should be noted that the first reflecting mirror 412 is formed of an ellipsoidal reflector having an ellipsoid of revolution in the present embodiment, but can also be formed of a paraboloidal reflector having a paraboloid of revolution, or a free-form reflector.

The lighting control device 414 controls the lighting state (lighting or extinction, and the luminance of the emitted light) of the light source lamp 411 based on a control signal input from the control device 6.

The color separation device 42 has a function of separating a plurality of colored lights corresponding to the first image (the two-dimensional image), a plurality of colored lights corresponding to the second image (the right-eye image), and a plurality of colored lights corresponding to the third image (the left-eye image) from the light emitted from the light source device 41, and then transmitting them, and a function of transmitting the light thus emitted without separation. The color separation device 42 has a first wheel 421 and a second wheel 422 as color wheels each disposed rotatably on the light path (on the illumination light axis A) of the light input from the light source device 41 to the light modulation device 46.

Figure 3:
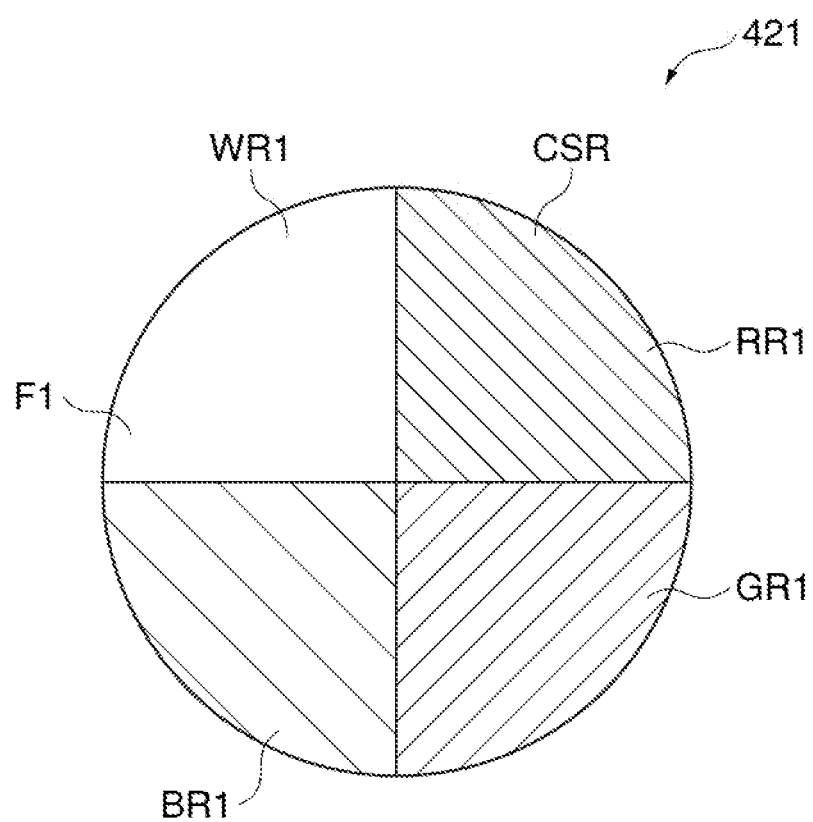
FIG. 3 is a diagram showing a configuration of a first wheel in the first embodiment.

FIG. 3 is a schematic diagram showing a surface F1 on the light entrance side in the first wheel 421.

The first wheel 421 is rotated by a first drive section 51 (see FIG. 5) described later of the rotation device 5 when forming and then projecting the first image (the two-dimensional image). As shown in FIG. 3, the first wheel 421 is provided with a first color separation region CSR for individually transmitting red light, green light, and blue light as the plurality of colored lights corresponding to the first image, and a first transmission region WR1 for transmitting the light including the plurality of colored lights.

The first color separation region CSR is provided with a red transmission region RR1 (a first colored light transmission region) for transmitting the red light as a first colored light corresponding to the first image out of the light input thereto, and blocking other colored lights, a green transmission region GR1 (a second colored light transmission region) for transmitting the green light as a second colored light corresponding to the first image, and blocking other colored lights, and a blue transmission region BR1 (a third colored light transmission region) for transmitting the blue light as a third colored light corresponding to the first image, and blocking other colored lights.

The first transmission region WR1 is a region for transmitting the light (white light) input from the light source device 41 without substantial change. In other words, the first transmission region WR1 is a region for transmitting the incident light without substantially generating a loss of the light in the visible range.

These regions RR1, GR1, BR1, and WR1 are each formed to have a fan shape obtained by dividing the surface F1 of the first wheel 421 on the light entrance side into equal parts. Further, these regions RR1, GR1, BR1, and WR1 are arranged sequentially in the clockwise direction when viewing the first wheel 421 from the light entrance side.

It should be noted that the rotation of the first wheel 421 in the case of forming the two-dimensional image and the three-dimensional image will be described later in detail.

Figure 4:
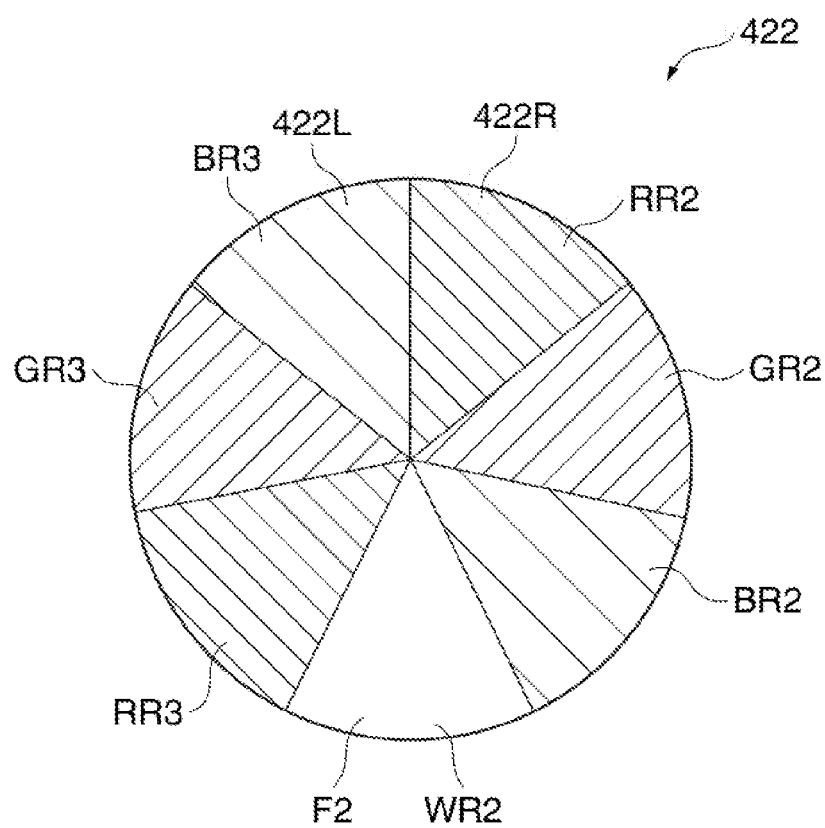
FIG. 4 is a diagram showing a configuration of a second wheel in the first embodiment.

FIG. 4 is a diagram showing a surface F2 on the light entrance side in the second wheel 422.

The second wheel 422 is disposed in a posterior stage (a downstream side) of the first wheel 421 in the optical path. Specifically, the light transmitted through the first wheel 421 enters the second wheel 422. The second wheel 422 is rotated by a second drive section 52 described later of the rotation device 5 when forming and then projecting the second and third images (the three-dimensional image).

As shown in FIG. 4, such a second wheel 422 is provided with a right region 422R, which is used when forming the second image (the right-eye image), and separates the plurality of colored lights corresponding to the second image, a left region 422L, which is used when forming the third image (the left-eye image), and separates the plurality of colored lights corresponding to the third image, and a second transmission region WR2 for transmitting the light (the light in the visible range including the plurality of colored lights corresponding to the second image and the plurality of colored lights corresponding to the third image) input from the first wheel 421 without substantial change. The right region 422R and the left region 422L correspond respectively to a second color separation region and a third color separation region in the invention.

Among these regions, the right region 422R is provided with a red transmission region RR2 (a fourth colored light transmission region) for transmitting the red light as a fourth colored light corresponding to the second image, and blocking other colored lights, a green transmission region GR2 (a fifth colored light transmission region) for transmitting the green light as a fifth colored light corresponding to the second image, and blocking other colored lights, and a blue transmission region BR2 (a sixth colored light transmission region) for transmitting the blue light as a sixth colored light corresponding to the second image, and blocking other colored lights.

Similarly, the left region 422L is provided with a red transmission region RR3 (a seventh colored light transmission region) for transmitting the red light as a seventh colored light corresponding to the third image, and blocking other colored lights, a green transmission region GR3 (an eighth colored light transmission region) for transmitting the green light as an eighth colored light corresponding to the third image, and blocking other colored lights, and a blue transmission region BR3 (a ninth colored light transmission region) for transmitting the blue light as a ninth colored light corresponding to the third image, and blocking other colored lights.

Further, the regions RR2, GR2, BR2, WR2, RR3, GR3, and BR3 are each formed to have a fan shape obtained by dividing the surface F2 of the second wheel 422 on the light entrance side into equal parts, and are arranged sequentially in the clockwise direction when viewing the second wheel 422 from the light entrance side.

It should be noted that the rotation of the second wheel 422 in the case of forming the two-dimensional image and the three-dimensional image will be described later in detail.

Here, although the red transmission regions RR2, RR3 of the second wheel 422 each transmit the colored light categorized as the red light, the transmission wavelength bands set respectively to the regions RR2, RR3 are different from each other. In the present embodiment, the transmission wavelength band of the region RR2 is set to a predetermined band centered on the wavelength of 615 nm, and the transmission wavelength band of the region RR3 is set to a predetermined band centered on the wavelength of 629 nm. Further, the respective transmission wavelength bands of the regions RR2, RR3 are set so as not to overlap each other. On the other hand, the red transmission region RR1 of the first wheel 421 is set to have a transmission wavelength band including the transmission wavelength band of the red transmission region RR2 of the second wheel 422 and the transmission wavelength band of the red transmission region RR3 of the second wheel 422.

Further, although the green transmission regions GR2, GR3 of the second wheel 422 each transmit the colored light categorized as the green light, the transmission wavelength bands set respectively to the regions GR2, GR3 are different from each other. In the present embodiment, the transmission wavelength band of the region GR2 is set to a predetermined band centered on the wavelength of 518 nm, and the transmission wavelength band of the region GR3 is set to a predetermined band centered on the wavelength of 532 nm. Further, the respective transmission wavelength bands of the regions GR2, GR3 are set so as not to overlap each other. On the other hand, the green transmission region GR1 of the first wheel 421 is set to have a transmission wavelength band including the transmission wavelength band of the green transmission region GR2 of the second wheel 422 and the transmission wavelength band of the green transmission region GR3 of the second wheel 422.

Similarly, although the blue transmission regions BR2, BR3 of the second wheel 422 each transmit the colored light categorized as the blue light, the transmission wavelength bands set respectively to the regions BR2, BR3 are different from each other. In the present embodiment, the transmission wavelength band of the region BR2 is set to a predetermined band centered on the wavelength of 432 nm, and the transmission wavelength band of the region BR3 is set to a predetermined band centered on the wavelength of 446 nm. Further, the respective transmission wavelength bands of the regions BR2, BR3 are set so as not to overlap each other. On the other hand, the blue transmission region BR1 of the first wheel 421 is set to have a transmission wavelength band including the transmission wavelength band of the blue transmission region BR2 of the second wheel 422 and the transmission wavelength band of the blue transmission region BR3 of the second wheel 422.

It should be noted that the wavelengths of the red light, the green light, and the blue light can arbitrarily be changed.

The uniformizing device 43 is disposed in a posterior stage (a downstream side) of the color separation device 42 in the light path. The uniformizing device 43 has a function of equalizing the illuminance (the illuminance of the light transmitted through the second wheel 422) in a perpendicular plane to the illumination light axis A. It should be noted that in the present embodiment, the uniformizing device 43 is formed of a rod integrator. However, besides the above, it is also possible to adopt a configuration having a collimating lens and a pair of lens arrays (multilens) each having a plurality of small lenses arranged in a matrix.

The collecting lenses 44 collect the light emitted from the uniformizing device 43.

The reflecting mirror 45 reflects the light, which is collected by the collecting lenses 44, toward the light modulation device 46.

The light modulation device 46 modulates the light input via the reflecting mirror 45 to thereby form the image corresponding to the drive signal input from the control device 6. In the present embodiment, the light modulation device 46 is formed of the DMD. In the DMD, there is arranged a plurality of movable micromirrors each corresponding to a pixel. Further, the moving state of each of the micromirrors is individually controlled, and by switching between the state in w-ich the incident light is reflected toward the opening of the projection optical device 47 and the state in which the incident light is reflected in a direction other than the direction toward the opening of the projection optical device 47, the image corresponding to the drive signal input thereto is formed. Such light, which is reflected by the DMD, and forms the image, proceeds toward the projection optical device 47.

The projection optical device 47 projects the light (the light forming the image) input from the light modulation device 46 to the screen Sc in an enlarged manner. Although a detailed graphical description is omitted, the projection optical device 47 is configured as a combination lens having a body tube and a plurality of lenses arranged in the body tube.

Configuration of Rotation Device

FIG. 5 is a block diagram showing a configuration of the rotation device 5 and the control device 6.

The rotation device 5 has the first drive section 51 for rotating the first wheel 421, and the second drive section 52 for rotating the second wheel 422. The first drive section 51 and the second drive section 52 rotate the first wheel 421 and the second wheel 422, respectively, around a rotational axis along the illumination light axis A.

The first drive section 51 and the second drive section 52 are each formed of an electric motor driven in accordance with a drive signal (a pulse signal) input from the control device 6. Further, although a detailed graphical description is omitted, a spindle of the electric motor constituting the first drive section 51 is inserted into a hole section formed at the center of the first wheel 421 to thereby rotatably support the first wheel 421. Further, a spindle of the electric motor constituting the second drive section 52 is inserted into a hole section formed at the center of the second wheel 422 to thereby rotatably support the second wheel 422.

Configuration of Control Device

The control device 6 controls overall operations of the projector 2A. The control device 6 is configured as a circuit board having a central processing unit (CPU), a random access memory (RAM), a read only memory (ROM), and so on mounted thereon. Further, the control device 6 functions as a light source control section 61, a first rotation control section 62, a second rotation control section 63, and a display control section 64 due to the CPU executing a program stored in the ROM.

Among these sections, the light source control section 61 outputs the control signal to the lighting control device 414 to control the lighting state of the light source lamp 411 with the lighting control device 414.

The first rotation control section 62 outputs the drive signal to the first drive section 51 to rotate the first wheel 421 with the first drive section 51. Similarly, the second rotation control section 63 outputs the drive signal to the second drive section 52 to rotate the second wheel 422 with the second drive section 52. It should be noted that the first rotation control section 62 and the second rotation control section 63 obtain the rotational angles of the first wheel 421 and the second wheel 422 to figure out the regions located on the illumination light axis A in the first wheel 421 and the second wheel 422. In other words, the first rotation control section 62 and the second rotation control section 63 figure out what regions in the first wheel 421 and the second wheel 422 are located on the illumination light axis A.

As such a configuration for obtaining the rotational angles, a configuration of obtaining the rotational angles based on the drive signals output by the respective rotation control sections 62, 63 can also be adopted. Further, a configuration provided with a detection device such as a potentiometer for detecting the rotational angles of the respective wheels 421, 422 can also be adopted.

The display control section 64 controls the operations of the respective control sections 61 through 63 described above. Besides the above, the display control section 64 processes the image information input from the outside of the projector 2A to output the drive signals corresponding to the image information to the light modulation device 46 to thereby make the light modulation device 46 form the image corresponding to the image information.

On this occasion, the display control section 64 switches the rotational states of the first wheel 421 and the second wheel 422 and the driving state of the light modulation device 46 between the case of displaying the first image as a two-dimensional image and the case of displaying the second and third images as a three-dimensional image.

Hereinafter, the rotational states of the respective wheels 421, 422 and the image formed by the light modulation device 46 will be explained separately between the case of displaying the two-dimensional image and the case of displaying the three-dimensional image. It should be noted that it is assumed in the following explanation that the light source device 41 is in the lighted state under the control of the light source control section 61.

State when Displaying Two-Dimensional Image

Figure 6:
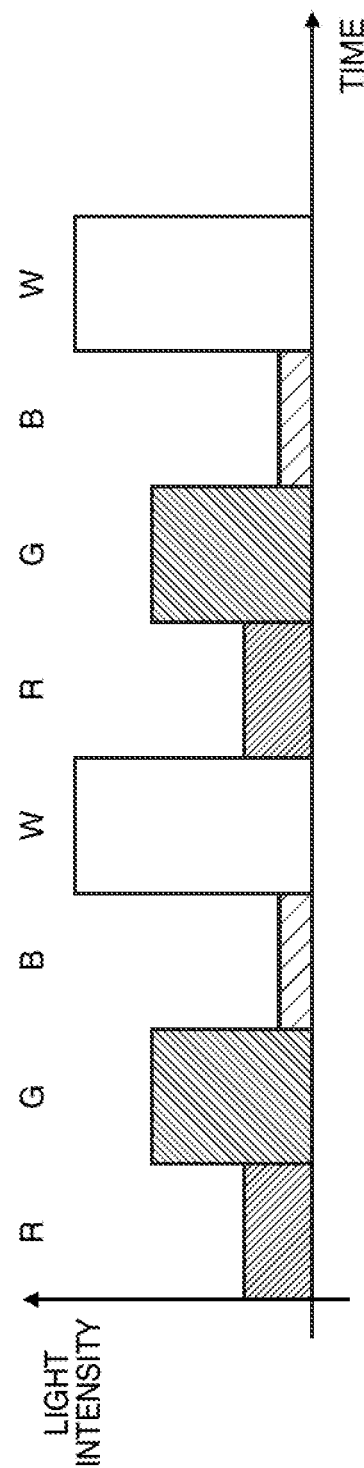
FIG. 6 is a diagram showing light transmitted through a color separation device in the first embodiment.

FIG. 6 is a diagram showing the colored lights entering the light modulation device 46 via the color separation device 42 when displaying the two-dimensional image and the light intensities thereof in a time-series manner.

In the case of projecting the first image as the two-dimensional image, the first rotation control section 62 rotates the first wheel 421 at a predetermined rotational speed (number of rotations per unit time) with the first drive section 51. On this occasion, the second rotation control section 63 stops the second wheel 422 in the state in which the second transmission region WR2 is located on the illumination light axis A using the second drive section 52. It should be noted that even if the second wheel 422 is not completely stopped, the rotation of the second wheel 422 is controlled so that the second transmission region WR2 is kept at the position on the illumination light axis A.

Therefore, the light emitted from the light source device 41 is transmitted through the first wheel 421 thus rotated, further transmitted through the second transmission region WR2, and then emitted from the color separation device 42. Thus, as shown in FIG. 6, the colored lights, namely the red light (R light), green light (G light), the blue light (B light), and the white light (W light), are sequentially emitted from the color separation device 42 with predetermined time intervals. Then, the colored lights enter the light modulation device 46 via the uniformizing device 43, the collecting lenses 44, and the reflecting mirror 45.

On the other hand, the drive signal for forming the color image corresponding to the light transmitted through each of the regions RR1, GR1, BR1, and WR1 of the first wheel 421 is input from the display control section 64 to the light modulation device 46. The light modulation device 46 forms the red image constituting the two-dimensional image when the red transmission region RR1 is located on the illumination light axis A. Further, the green image constituting the two-dimensional image is formed when the green transmission region GR1 is located on the illumination light axis A, and further the blue image constituting the two-dimensional image is formed when the blue transmission region BR1 is located thereon.

It should be noted that the image formed when the first transmission region WR1 is located on the illumination light axis A is an image for improving the brightness of the two-dimensional image projected on the screen Sc. Therefore, the image can be a white image with the pixels having even luminance, or a white image (e.g., a white image obtained by averaging the images of the respective colors) corresponding to the red image, the green image, and the blue image.

The images thus formed in such a manner are projected by the projection optical device 47 on the screen Sc. Then, the images are combined due to the afterimage effect of the observer, and are visually recognized as a two-dimensional image.

State when Displaying Three-Dimensional Image

Figure 7:
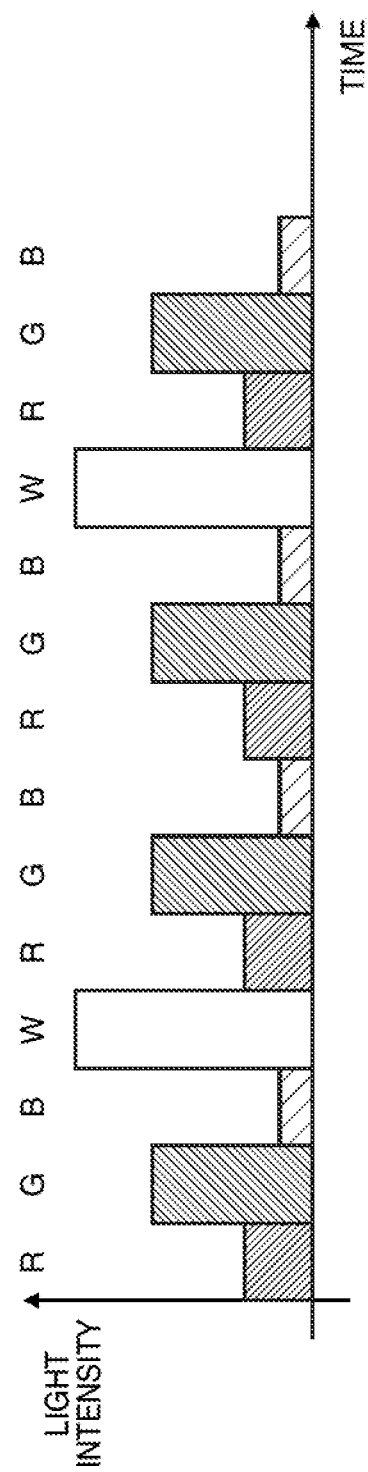
FIG. 7 is a diagram showing the light transmitted through the color separation device in the first embodiment.

FIG. 7 is a diagram showing the colored lights entering the light modulation device 46 via the color separation device 42 when displaying the three-dimensional image and the light intensities thereof in a time-series manner.

In the case of projecting the second and third images as the three-dimensional image, the first rotation control section 62 stops the first wheel 421 in the state in which the first transmission region WR1 is located on the illumination light axis A using the first drive section 51. It should be noted that even if the first wheel 421 is not completely stopped, the rotation of the first wheel 421 is controlled so that the first transmission region WR1 is kept at the position on the illumination light axis A.

On the other hand, the second rotation control section 63 rotates the second wheel 422 at a predetermined rotational speed with the second drive section 52.

Therefore, the light emitted from the light source device 41 is transmitted through the first transmission region WR1, further transmitted through the second wheel 422 thus rotated, and then emitted from the color separation device 42. Thus, as shown in FIG. 7, the red light, the green light, the blue light used for forming the second image as the right-eye image, the white light, and the red light, the green light, and the blue light used for farming the third image as the left-eye image are emitted sequentially from the color separation device 42 with predetermined time intervals. These colored lights enter the light modulation device 46 via the uniformizing device 43, the collecting lenses 44, and the reflecting mirror 45. It should be noted that the rotational speed of the second wheel 422 can be equal to the rotational speed of the first wheel 421 when displaying the first image as the two-dimensional image, or can be different therefrom.

On the other hand, the drive signal for forming the color image corresponding to the light transmitted through each of the regions RR2, GR2, BR2, WR2, RR3, GR3, and BR3 of the second wheel 422 is input from the display control section 64 to the light modulation device 46.

Thus, the light modulation device 46 forms the red image constituting the right-eye image when the region RR2 is located on the illumination light axis A. Similarly, the green image constituting the right-eye image is formed when the region GR2 is located on the illumination light axis A, and the blue image constituting the right-eye image is formed when the region BR2 is located thereon.

On the other hand, the light modulation device 46 forms the red image constituting the left-eye image when the region RR3 is located on the illumination light axis A. Similarly, the green image constituting the left-eye image is formed when the region GR3 is located on the illumination light axis A, and the blue image constituting the left-eye image is formed when the region BR3 is located thereon.

The images of the respective colors are projected by the projection optical device 47 on the screen Sc.

Here, the right-eye separation section 91R constituting the pair of glasses 9A is provided with a bandpass filter for transmitting the red light transmitted through the red transmission region RR2, the green light transmitted through the green transmission region GR2, and the blue light transmitted through the blue transmission region BR2. Therefore, the colored lights constituting the second image as the right-eye image are transmitted through the right-eye separation section 91R, and then enter the right eye of the observer. However, the colored lights constituting the third image as the left-eye image fail to be transmitted through the right-eye separation section 91R, and therefore fail to enter the right eye of the observer.

Similarly, the left-eye separation section 91L constituting the pair of glasses 9A is provided with a bandpass filter for transmitting the red light transmitted through the red transmission region RR3, the green light transmitted through the green transmission region GR3, and the blue light transmitted through the blue transmission region BR3. Therefore, the colored lights constituting the third image as the left-eye image are transmitted through the left-eye separation section 91L, and then enter the left eye of the observer. However, the colored lights constituting the second image as the right-eye image fail to be transmitted through the left-eye separation section 91L, and therefore fail to enter the left eye of the observer.

The red image, the green image, and the blue image having entered the right eye of the observer in such a manner as described above are combined due to the afterimage effect, and are then recognized. Similarly, the red image, the green image, and the blue image having entered the left eye of the observer are combined due to the afterimage effect, and are then recognized. Thus, the right-eye image and the left-eye image are visually recognized individually with the right eye and the left eye, and the three-dimensional image with a three-dimensional appearance can be recognized.

It should be noted that the light modulation device 46 forms a black image when the region WR2 is located on the illumination light axis A. The reason therefor is as follows.

If the white image, for example, is formed and projected when the second transmission region WR2 is located on the illumination light axis A, a part of the light constituting the white image is transmitted through the right-eye separation section 91R and the left-eye separation section 91L, and enters both of the right eye and the left eye of the observer at the same time. In such a case, the part of the light is recognized as noise, which deteriorates the right-eye image and the left-eye image. In contrast, in the present embodiment, the light modulation device 46 forms the black image to thereby prevent the unwanted light, which deteriorates the right-eye image and the left-eye image, from entering the right eye and the left eye of the observer.

According to the image display system 1A related to the present embodiment explained hereinabove, the following advantages can be obtained.

In the case in which the projector 2A projects the two-dimensional image, the second wheel 422 is stopped in the state in which the second transmission region WR2 is located on the light path (the illumination light axis A) of the light emitted from the light source device 41, and the first wheel 421 alone is rotated. On this occasion, the light emitted from the light source device 41 enters the first color separation region CSR of the first wheel 421, and the red light, the green light, and the blue light corresponding to the first image are individually transmitted through the first color separation region CSR. These colored lights are transmitted through the second transmission region WR2 of the second wheel 422, and then enter the light modulation device 46 via the uniformizing device 43, the collecting lenses 44, and the reflecting mirror 45, and form the first image as the two-dimensional image.

On the other hand, in the case in which the projector 2A projects the right-eye image and the left-eye image constituting the three-dimensional image, the first wheel 421 is stopped in the state in which the first transmission region WR1 is located on the illumination light axis A, and the second wheel 422 alone is rotated. On this occasion, the light emitted from the light source device 41 is transmitted through the first transmission region WR1, and then enters the second wheel 422 thus rotated. The red light, the green light, and the blue light (the red light, the green light, and the blue light each corresponding to the second image) having been transmitted through the right region 422R of the second wheel 422 individually enter the light modulation device 46 via the constituents 43 through 45 described above, and the second image as the right-eye image is formed by these colored lights. Further, the red light, the green light, and the blue light (the red light, the green light, and the blue light each corresponding to the third image) having been transmitted through the left region 422L of the second wheel 422 individually enter the light modulation device 46 via the constituents 43 through 45 described above, and the third image as the left-eye image is formed by these colored lights.

Although the right region 422R and the left region 422L transmit each of the red light, the green light, and the blue light, the characteristics of the colored lights transmitted through the right region 422R are different from the characteristics of the colored lights transmitted through the left region 422L. Specifically, the wavelength of the red light transmitted through the red transmission region RR2 of the right region 422R and the wavelength of the red light transmitted through the red transmission region RR3 of the left region 422L are different from each other. Similarly, the wavelengths of the green light and the blue light transmitted through the right region 422R and the wavelengths of the green light and the blue light transmitted through the left region 422L are different from each other. Therefore, based on the difference in wavelength, the right-eye image and the left-eye image are separated by the right-eye separation section 91R and the left-eye separation section 91L of the pair of glasses 9A.

According to the projector 2A having such a configuration, in each of the case of projecting the first image as the two-dimensional image and the case of projecting the second and third images as the three-dimensional image, it is not required to rotate the first wheel 421 and the second wheel 422 in sync with each other. Therefore, the rotation control of the first wheel 421 and the second wheel 422 by the control device 6 can be simplified.

Further, when forming the image, either one of the first wheel 421 and the second wheel 422 is rotated, and the other thereof is stopped. Therefore, there is no chance of causing the difference in rotation, which can be caused when rotating both of the wheels 421, 422. Therefore, it is possible not only to appropriately display the two-dimensional image but also to appropriately display the three-dimensional image since the colored lights forming the right-eye image and the colored lights forming the left-eye image can appropriately be separated by the second wheel 422.

Further, in the case of the configuration in which the polarization plate wheel and the color wheel are provided instead of the first wheel 421 and the second wheel 422, and each of the wheels is rotated, if a failure occurs in the red transmission region, the green transmission region, and the blue transmission region provided to the color wheel, either the two-dimensional image or the three-dimensional image fails to be displayed.

In contrast, even in the case in which a failure occurs in either one of the first wheel 421 and the second wheel 422, the red light, the green light, and the blue light can individually be separated from the light emitted from the light source device 41 using the other thereof, and either of the two-dimensional image and the three-dimensional image can be displayed. Therefore, the function of the projector 2A can be assured.

The second image as the right-eye image and the third image as the left-eye image can be separated due to the difference in wavelength between the colored lights (the red light, the green light, and the blue light) forming one of the second and third images and the colored lights forming the other thereof. Further, the right-eye separation section 91R provided to the pair of glasses 9A transmits the red light, the green light, and the blue light forming the second image as the right-eye image, and blocks the third image as the left-eye image. In contrast, the left-eye separation section 91L transmits the red light, the green light, and the blue light forming the third image as the left-eye image, and blocks the second image as the right-eye image. According to this configuration, the right-eye image and the left-eye image can surely be separated by the right-eye separation section 91R and the left-eye separation section 91L, and thus, it is possible to make these images individually enter the right eye and the left eye of the observer. Therefore, it is possible to visually recognize the right-eye image and the left-eye image individually in a reliable manner.

In the case of displaying the three-dimensional image, namely the case of projecting the second image as the right-eye image and the third image as the left-eye image, the light modulation device 46 forms a black image at the timing at which the second transmission region WR2 is located on the illumination light axis A.

According to this configuration, it is possible to inhibit the light (the light causing the noise described above) deteriorating each of the images from entering the both eyes simultaneously. Therefore, the deterioration of the right-eye image and the left-eye image can be suppressed.

It should be noted that by blocking the light entering the light modulation device 46 with a shutter or the like instead of forming the black image at the timing at which the second transmission region WR2 is located on the illumination light axis A, substantially the same advantage can be obtained.

Second Embodiment

Then, a second embodiment of the invention will be explained with reference to the accompanying drawings.

The image display system according to the present embodiment has substantially the same configuration as that of the image display system 1A described above. However, the image display system 1A is for displaying and observing the three-dimensional image using a so-called wavelength division system on the one hand, the image display system according to the present embodiment is for displaying and observing the three-dimensional image using a so-called polarization system on the other hand. In this regard, the image display system according to the present embodiment and the image display system 1A described above are different from each other. It should be noted that in the explanation below, the part the same or substantially the same as the part having already been explained is denoted with the same reference symbol, and the explanation therefor will be omitted.

Figure 8:
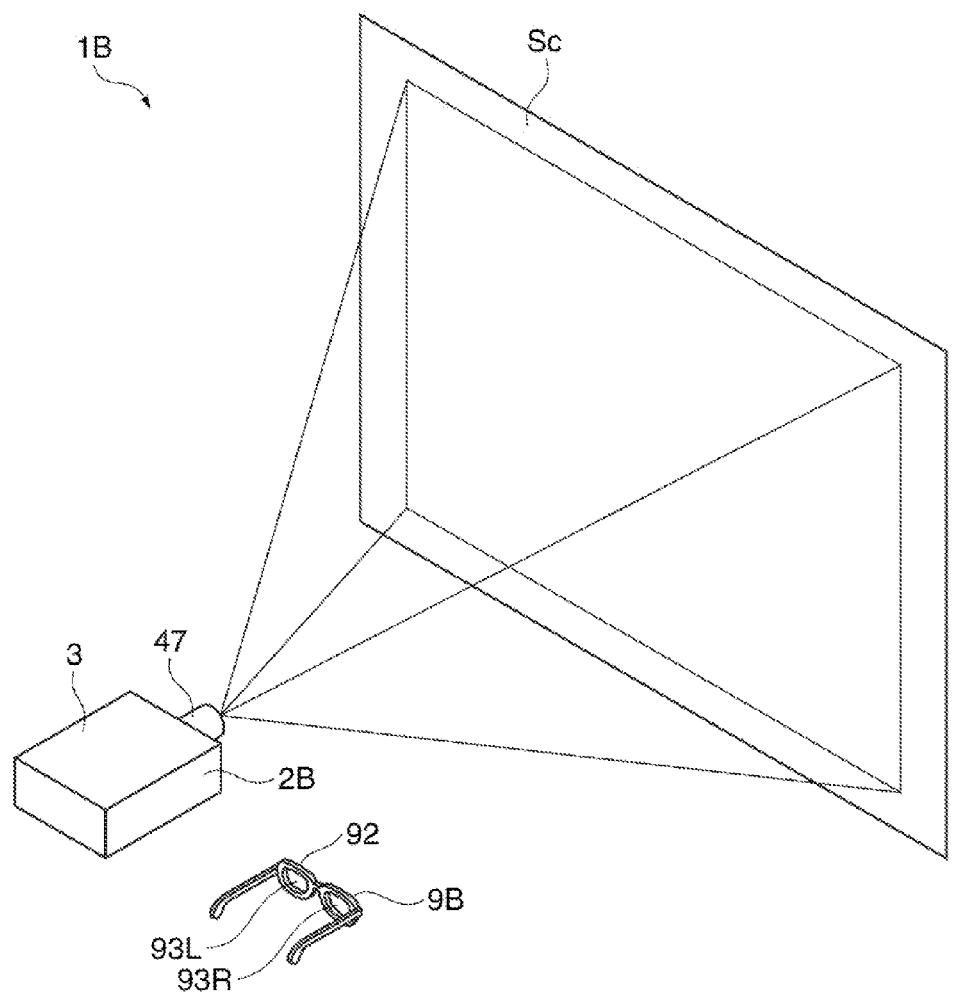
FIG. 8 is a schematic diagram showing a configuration of an image display system according to a second embodiment of the invention.

FIG. 8 is a schematic diagram showing an image display system 1B according to the present embodiment.

The image display system 1B according to the present embodiment is provided with a projector 2B, the screen Sc, and a pair of glasses 9B similarly to the image display system 1A described above. In the image display system 1B, when the two-dimensional image is projected on the screen Sc by the projector 2B, the observer observes the two-dimensional image with the naked eyes. In contrast, when the three-dimensional image is projected on the screen Sc by the projector 2B, the observer observes the three-dimensional image with the pair of glasses 9B.

Configuration of Glasses

Similarly to the pair of glasses 9A described above, the pair of glasses 9B have a right-eye separation section 93R disposed at a position corresponding to the right eye of the observer, a left-eye separation section 93L disposed at a position corresponding to the left eye, and the frame 92 for supporting these separation sections.

The right-eye separation section 93R and the left-eye separation section 93L correspond respectively to the first separation section and the second separation section according to the invention. Among these sections, the right-eye separation section 93R transmits the right-eye image, and blocks the left-eye image. In contrast, the left-eye separation section 93L transmits the left-eye image, and blocks the right-eye image. The configuration of the right-eye separation section 93R and the left-eye separation section 93L will be explained later in detail.

Configuration of Projector

Figure 9:
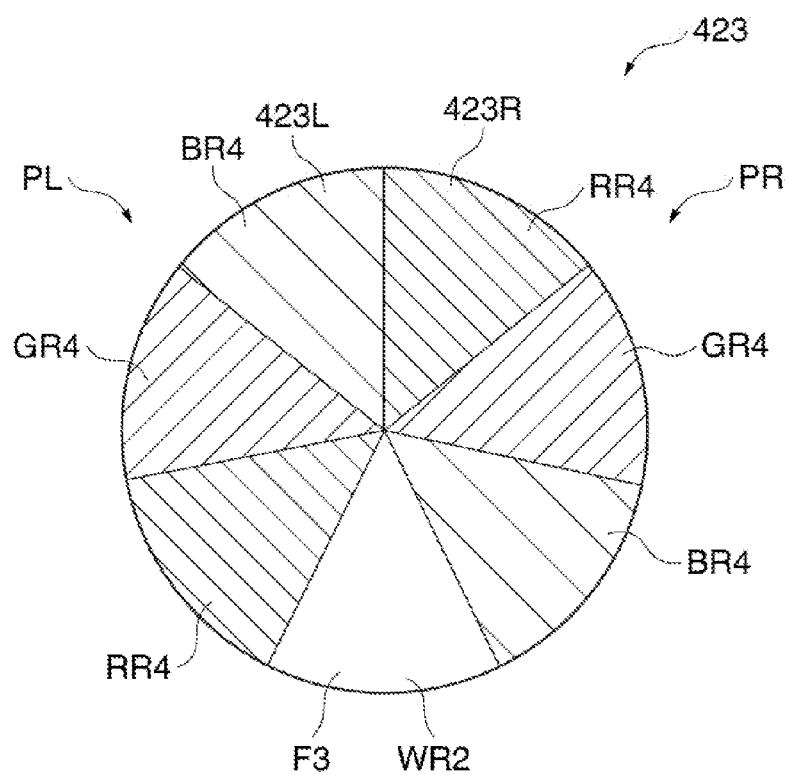
FIG. 9 is a diagram showing a configuration of a second wheel in the second embodiment.

FIG. 9 is a diagram showing a surface F3 on the light entrance side in a second wheel 423.

The projector 2B has substantially the same configuration and function as those of the projector 2A except the configuration in which the second wheel 423 is provided instead of the second wheel 422, and the second drive section 52 controlled by the second rotation control section 63 rotates the second wheel 423.

Similarly to the second wheel 422, the second wheel 423 is disposed on the light path of the light input from the light source device 41 to the light modulation device 46, and between the first wheel 421 and the uniformizing device 43. As shown in FIG. 9, the second wheel 423 is provided with a right region 423R used when forming the second image as the right-eye image, a left region 423L used when forming the third image as the left-eye image, and the second transmission region WR2 used when forming the first image as the two-dimensional image. The right region 423R and the left region 423L correspond respectively to the second color separation region and the third color separation region according to the invention.

Similarly to the right region 422R, the right region 423R is provided with a red transmission region RR4 (the fourth colored light transmission region) for transmitting the red light as the fourth colored light corresponding to the second image, a green transmission region GR4 (the fifth colored light transmission region) for transmitting the green light as the fifth colored light corresponding to the second image, and a blue transmission region BR4 (the sixth colored light transmission region) for transmitting the blue light as the sixth colored light corresponding to the second image. Besides the above, a polarization element PR is disposed on either one of the light entrance side and the light exit side in the right region 423R.

Further, the left region 423L is provided with the red transmission region RR4 (the seventh colored light transmission region) for transmitting the red light as the seventh colored light corresponding to the third image, the green transmission region GR4 (the eighth colored light transmission region) for transmitting the green light as the eighth colored light corresponding to the third image, and the blue transmission region BR4 (the ninth colored light transmission region) for transmitting the blue light as the ninth colored light corresponding to the third image. Besides the above, a polarization element PL is disposed on either one of the light entrance side and the light exit side in the left region 423L.

Further, these regions RR4, GR4, and BR4 of the right region 423R, the region WR2, and the regions RR4, GR4, and BR4 of the left region 423L are each formed to have a fan shape obtained by dividing the surface F3 of the second wheel 423 on the light entrance side into equal parts, and are arranged sequentially in the clockwise direction when viewing the second wheel 423 from the light entrance side.

Here, the transmission wavelength band set to the red transmission region RR4 of the right region 423R and the transmission wavelength band set to the red transmission region RR4 of the left region 423L are equal to each other. Further, the transmission wavelength band of the green transmission region GR4 of the right region 423R and the transmission wavelength band of the green transmission region GR4 of the left region 423L are equal to each other. Further, the transmission wavelength band of the blue transmission region BR4 of the right region 423R and the transmission wavelength band of the blue transmission region BR4 of the left region 423L are equal to each other. Further, the transmission wavelength band set to the region RR4 of the right region 423R and the region RR4 of the left region 423L in the second wheel 423 and the transmission wavelength band set to the region RR1 in the first wheel 421 can be set equal to each other. Further, the transmission wavelength band set to the region GR4 of the right region 423R and the region GR4 of the left region 423L in the second wheel 423 and the transmission wavelength band set to the region GR1 in the first wheel 421 can be set equal to each other. Similarly, the transmission wavelength band set to the region BR4 of the right region 423R and the region BR4 of the left region 423L in the second wheel 423 and the transmission wavelength band set to the region BR1 in the first wheel 421 can be set equal to each other.

On the other hand, the polarization direction of the light transmitted through the polarization element PR disposed in the right region 423R and the polarization direction of the light transmitted through the polarization element PL disposed in the left region 423L are different from each other. Such polarization elements PR, PL in the present embodiment are each a polarization element transmitting a linearly polarized light, and the polarization element PR transmits the S-polarized light, and the polarization element PL transmits the P-polarized light.

Therefore, the red light, the green light, and the blue light (the fourth through sixth colored lights) transmitted through the regions RR4, GR4, and BR4 of the right region 423R and the polarization element PR, and the red light, the green light, and the blue light (the seventh through ninth colored lights) transmitted through the regions RR4, GR4, and BR4 of the left region 423L and the polarization element PL are different in polarization direction from each other.

It should be noted that it is also possible to adopt a configuration in which the polarization element PR transmits the P-polarized light, and the polarization element PL transmits the S-polarized light. On the other hand, the first wheel 421 transmits polarized light with either polarization direction, namely the light having random polarization directions.

In the projector 2B having such a second wheel 423 and the first wheel 421, the two-dimensional image (the first image) and the three-dimensional image (the second image and the third image) are formed and projected due to substantially the same operation as that of the projector 2A described above.

Among these images, in the case of projecting the three-dimensional image, the observer observes the three-dimensional image using the pair of glasses 9B described above. The right-eye separation section 93R provided to the pair of glasses 9B has the same polarization element as the polarization element PR provided to the right region 423R. Therefore, the right-eye separation section 93R transmits the right-eye image (the second image), and blocks the left-eye image (the third image). On the other hand, the left-eye separation section 93L has the same polarization element as the polarization element PL provided to the left region 423L. Therefore, the left-eye separation section 93L transmits the left-eye image (the third image), and blocks the right-eye image (the second image).

By using such pair of glasses 9B, the right-eye image projected by the projector 2B is observed by the right eye of the observer, and the left-eye image is observed by the left eye of the observer. Further, in such a manner, the image (the three-dimensional image), which can be viewed stereoscopically, is visually recognized due to the parallax.

It should be noted that the two-dimensional image can be observed without using the pair of glasses 9B similarly to the image display system 1A described above. Further, in the case in which the projector 2B projects the three-dimensional image, the light modulation device 46 forms the black image at the timing at which the second transmission region WR2 in the second wheel 423 thus rotated is located on the illumination light axis A similarly to the case of the image display system 1A described above.

According to the image display system 1B related to the present embodiment explained hereinabove, in addition to the advantages substantially the same as those of the image display system 1A described above, the following advantages can be obtained.

Since the second image as the right-eye image and the third image as the left-eye image are respectively constituted by the polarized lights having the respective polarization directions different from each other, the right-eye image and the left-eye image can surely be separated by the right-eye separation section 93R and the left-eye separation section 93L using the difference in polarization direction. Therefore, it is possible to make the right-eye image and the left-eye image respectively enter the right eye and the left eye of the observer individually, and it is possible to surely make the three-dimensional image be visually recognized.

Modifications of Embodiments

The invention is not limited to the embodiments described above, but includes modifications and improvements in a range where the advantages of the invention can be achieved.

In each of the embodiments described above, there is adopted the configuration of making the light emitted from the light source device 41 and transmitted through the color separation device 42 enter the light modulation device 46 via the uniformizing device 43, the collecting lenses 44, and the reflecting mirror 45. However, the invention is not limited thereto. Specifically, the constituents other than the light source device 41, the color separation device 42, the light modulation device 46, and the projection optical device 47 can arbitrarily be changed. Further, the light path of the light emitted from the light source device 41 and projected from the projection optical device 47 can arbitrarily be changed by, for example, folding.

Although in each of the embodiments the light source device 41 has the configuration provided with the light source lamp 411, the invention is not limited thereto. For example, the light source device can have a configuration provided with a solid-state light source such as a light emitting diode (LED) or a laser diode (LD). In the case of adopting the LED, a white LED can be adopted, or a red LED, a green LED, and a blue LED can also be adopted. It should be noted that in the case in which the solid-state light source is adopted as the light source device of the projector 2A described above, it is also possible for the lighting control device 414 to put the solid-state light source off at the timing at which the second transmission region WR2 is located on the illumination light axis A when displaying the three-dimensional image.

In the second embodiment described above, it is assumed that the polarization elements PR, PL respectively transmit the S-polarized light and the P-polarized light as the linearly polarized light, and the right-eye separation section 93R and the left-eye separation section 93L provided to the pair of glasses 9B respectively transmit the S-polarized light and the P-polarized light in accordance with the polarization elements PR, PL. However, the invention is not limited thereto. Specifically, it is also possible to adopt a configuration in which the polarization elements PR, PL transmit the circularly polarized light, and the configuration in which the right-eye separation section 93R and the left-eye separation section 93L transmit the circularly polarized light in accordance with the polarization elements PR, PL. For example, it is also possible to adopt a configuration in which either one of the pairs of polarization element PR and the right-eye separation section 93R, and the polarization element PL and the left-eye separation section 93L transmits the right circularly polarized light and the other thereof transmits the left circularly polarized light.

Further, it is also possible to combine the configuration cited in the first embodiment and the configuration cited in the second configuration to thereby provide the polarization elements PR, PL, through which the polarized lights having the respective polarization directions different from each other are transmitted, respectively to the right region 422R and the left region 422L as the second color separation region and the third color separation region.

Although the configuration of disposing the second wheel 422, 423 in the posterior stage (the downstream side) of the first wheel 421 in the light path is adopted in each of the embodiments, the invention is not limited thereto. Specifically, the positions of the first wheel 421 and the second wheel 422, 423 can be reversed.

Although it is assumed that the first wheel 421 and the second wheel 422, 423 each have the regions of transmitting the red light, the green light, and the blue light each corresponding to the first through third images, the invention is not limited thereto. Specifically, it is also possible to provide a region for transmitting another colored light to each of the wheels. For example, it is also possible to form the regions for transmitting the respective colored lights of cyan, magenta, and yellow corresponding to the first through third images. Further, the number of the plurality of colored lights (the number of the plurality of colored lights constituting the first through third images) corresponding to the first through third images is not limited to three, but can be set to two or greater than three.

Further, in each of the embodiments, the red transmission region, the green transmission region, and the blue transmission region each having a fan shape are formed in the first color separation region CSR of the first wheel 421 so as to divide the first color separation region CSR into equal parts, and the red transmission region, the green transmission region, and the blue transmission region each having a fan shape are formed in each of the right region 422R, 423R and the left region 422L, 423L of the second wheel 422, 423 so as to divide each of the regions into equal parts. However, the invention is not limited thereto. Specifically, the occupied areas of the respective regions in each of the wheels can be different from each other in accordance with the spectrum or the light intensity of the light emitted from the light source device. Further, the arrangement sequence of the regions can arbitrarily be set, and the alignment sequence of the red transmission region, the green transmission region, and the blue transmission region in each of the first color separation region CSR, the right region 422R, 423R, and the left region 422L, 423L can also be set arbitrarily.

Although in each of the embodiments, the projector 2A, 2B is configured to be capable of displaying the three-dimensional image constituted by the right-eye image and the left-eye image as the second image and the third image in addition to the two-dimensional image as the first image, the invention is not limited thereto. Specifically, it is possible to project two-dimensional images (corresponding to the second image and the third image) different from each other instead of the right-eye image and the left-eye image. In this case, the observer wearing a pair of glasses, which have separation sections similar to the right-eye separation section 91R, 93R disposed so as to correspond to the right eye and the left eye of the observer, can observe either one of the second image and the third image. Further, the observer wearing a pair of glasses, which have separation sections similar to the left-eye separation section 91L, 93L disposed so as to correspond to the right eye and the left eye of the observer, can observe the other image.

The invention can be applied to a projector, and in particular, preferably to a projector capable of displaying the two-dimensional image and the three-dimensional image separately.

The entire disclosure of Japanese Patent Application No. 2012-021672, filed Feb. 3, 2012 and Japanese Patent Application No. 2012-260248, filed Nov. 28, 2012 are expressly incorporated by reference herein.

What is claimed is:

1. A projector, which can be switched between a mode of projecting a first image and a mode of projecting a second image and a third image, comprising:
    a light source device;
    a light modulation device adapted to modulate light emitted from the light source device;
    a projection optical device adapted to project the light modulated;
    a first wheel rotatably disposed on a light path of the light entering the light modulation device from the light source device, and having a first color separation region adapted to transmit the light from the light source device while separating the light into a plurality of colored lights corresponding to the first image, and a first transmission region adapted to transmit the light including the plurality of colored lights;
    a second wheel rotatably disposed on the light path of the light entering the light modulation device from the light source device, and having a second color separation region adapted to transmit the light from the light source device while separating the light into a plurality of colored lights corresponding to the second image, a third color separation region adapted to transmit the light from the light source device while separating the light into a plurality of colored lights corresponding to the third image, and a second transmission region adapted to transmit the light including the plurality of colored lights; and
    a control device adapted to control operations of the light modulation device, the first wheel, and the second wheel,
    wherein:
    the colored lights separated into the first color separation region, the second color separation region, and the third color separation region have respective light characteristics different from each other,
    the first color separation region of the first wheel is provided with a first colored light transmission region, a second colored light transmission region, and a third colored light transmission region, which respectively transmit a first colored light, a second colored light, and a third colored light and each block colored lights other than the corresponding colored light,
    the second color separation region of the second wheel is provided with a fourth colored light transmission region, a fifth colored light transmission region, and a sixth colored transmission region, which respectively transmit a fourth colored light, a fifth colored light, and a sixth colored light, and each block colored lights other than the corresponding colored light,
    the third color separation region of the second wheel is provided with a seventh colored light transmission region, an eighth colored light transmission region, and a ninth colored light transmission region, which respectively transmit a seventh colored light, an eighth colored light, and a ninth colored light, and each block colored lights other than the corresponding colored light,
    the first colored light, the second colored light, the third colored light, the fourth colored light, the fifth colored light, the sixth colored light, the seventh colored light, the eighth colored light, and the ninth colored light have respective wavelength bands different from each other, and
    the control device further makes
        the light modulation device form the first image while keeping the second wheel in a state in which the second transmission region is located on the light path, and rotating the first wheel when projecting the first image, and
        the light modulation device form the second image and the third image while keeping the first wheel in a state in which the first transmission region is located on the light path, and rotating the second wheel when projecting the second image and the third image that then form a three-dimensional image.

2. The projector according to claim 1, wherein
the second color separation region and the third color separation region are provided with respective polarization elements transmitting lights having respective polarization directions different from each other.

3. The projector according to claim 1, wherein
the light modulation device forms a black image at a timing at which the second transmission region is located on the light path when projecting the second image and the third image.

4. An image display system comprising:
the projector according to claim 1; and
a pair of glasses provided with at least one of
    a first separation section adapted to transmit the colored lights transmitted through the second color separation region and block the colored lights transmitted through the third color separation region and
    a second separation section adapted to transmit the colored lights transmitted through the third color separation region and block the colored lights transmitted through the second color separation region.

5. An image display system comprising:
the projector according to claim 2; and
a pair of glasses provided with at least one of
    a first separation section adapted to transmit the colored lights transmitted through the second color separation region and block the colored lights transmitted through the third color separation region and
    a second separation section adapted to transmit the colored lights transmitted through the third color separation region and block the colored lights transmitted through the second color separation region.

6. An image display system comprising:
the projector according to claim 3; and
a pair of glasses provided with at least one of
    a first separation section adapted to transmit the colored lights transmitted through the second color separation region and block the colored lights transmitted through the third color separation region and
    a second separation section adapted to transmit the colored lights transmitted through the third color separation region and block the colored lights transmitted through the second color separation region.

* * * * *